US006386336B2

(12) United States Patent
Mohr et al.

(10) Patent No.: US 6,386,336 B2
(45) Date of Patent: May 14, 2002

(54) ACTUATOR MODULE FOR A VEHICLE BRAKE AND VEHICLE BRAKE WITH SUCH AN ACTUATOR MODULE

(75) Inventors: Kurt Mohr, Halsenbach; Siegfried Franz, Koblenz, both of (DE)

(73) Assignee: Lucas Industries public limited company (GB)

( * ) Notice: Subject to any disclaimer, the term of this patent is extended or adjusted under 35 U.S.C. 154(b) by 0 days.

(21) Appl. No.: 09/727,731

(22) Filed: Dec. 1, 2000

Related U.S. Application Data

(63) Continuation of application No. PCT/EP99/03274, filed on May 12, 1999.

(30) Foreign Application Priority Data

Jun. 3, 1998 (DE) .......................................... 198 24 771

(51) Int. Cl.[7] ............................................... F16D 65/14
(52) U.S. Cl. ................ 188/106 F; 188/72.6; 188/72.9; 188/156; 188/162
(58) Field of Search ........................ 188/106 F, 106 P, 188/106 R, 72.6, 72.1, 72.3, 72.9, 162, 156, 157, 163, 173

(56) References Cited

U.S. PATENT DOCUMENTS 3,592,300 A * 7/1971 Thomas ...................... 188/72.2
3,647,031 A * 3/1972 Burnett ...................... 188/72.6
3,809,191 A * 5/1974 Woodward .............. 188/106 A
4,540,066 A   9/1985 Evans
5,348,123 A * 9/1994 Takahashi et al. ......... 188/72.1
6,079,792 A * 6/2000 Kessler ................... 188/112 A

FOREIGN PATENT DOCUMENTS

| FR | 2584466 | 1/1987 |
| GB | 2098682 | 11/1982 |
| WO | 98/01682 | 1/1998 |

* cited by examiner

*Primary Examiner*—Pam Rodriguez
(74) *Attorney, Agent, or Firm*—MacMillan, Sobanski & Todd, LLC

(57) ABSTRACT

The invention relates to an actuator subassembly for a vehicle brake with a drive, which is connected to an input side of a lever arrangement, wherein an output side of the lever arrangement is adapted to operate at least one friction element of the vehicle brake. If a vehicle brake of this kind is used as a parking brake, static preloading forces occur at the friction element. In order that these forces may still be taken up within the actuator subassembly, it is proposed that the lever arrangement be changed over from a service brake region, in which it is self-releasing, beyond its force reversal point into a parking brake position, in which it is self-locking. Various operating possibilities for an actuator subassembly of this kind and the use thereof in a vehicle brake are described.

17 Claims, 2 Drawing Sheets

ACTUATOR MODULE FOR A VEHICLE BRAKE AND VEHICLE BRAKE WITH SUCH AN ACTUATOR MODULE

CROSS REFERENCE TO RELATED APPLICATIONS

This application is a continuation of International Application No. PCT/EP99/03274, filed May 12, 1999, which claims priority to German Patent Application No. 19824771.0, filed Jun. 3, 1998.

BACKGROUND OF THE INVENTION

Brake equipment in the vehicle brake field generally comprises a service brake system and a parking brake system.

It is also usual to provide each vehicle wheel with a brake having a disc- or drum-shaped friction surface as well as a friction element and an actuator, which presses the friction element against the friction surface when the brake is operated. The subassembly comprising the actuator and the friction element is called "actuator subassembly" in the following.

In a motor vehicle the service and the parking brake system generally employ a common brake, whereas their operating and transmission devices are separate. This is required for safety reasons and on account of legal regulations.

In this respect the operation of the actuator subassembly for a service brake function is usually effected by the pedal force and an auxiliary force, with pneumatic (vacuum, compressed air), hydraulic and also electrical energy primarily being used to produce the auxiliary force. In contrast, the parking brake system is generally operated manually, by hand or foot, and maintained in this state by mechanical means.

The object of more recent developments of vehicle brakes is also to perform the parking brake function by means of auxiliary energy, such as, e.g. electrical energy, in order to simplify the brake system. A further aim is to minimise the constructional volume and the weight of the brake at the wheel in order to keep the unsprung mass of the motor vehicle as low as possible.

Where known vehicle brakes are concerned, the holding force for a parking brake function is applied by means of auxiliary or external energy directly by a drive of the actuator subassembly. In this connection locking and emergency release devices are required in case the power supply for the drive, e.g. the electricity supply of an electric motor, should fail, so that the parking brake initially remains locked and can be released if required. Devices of this kind are expensive and in some cases require a considerable amount of power for the drive.

The applicant's publication WO 98/01682 discloses an actuator subassembly in which a drive can move a friction element of the vehicle brake via a toggle arrangement. This actuator subassembly can also perform the function of a parking brake by introducing an additional input force into the toggle arrangement. However the fact that a permanent, very high holding force has to be applied while operating the parking brake proves to be problematic in this respect.

SUMMARY OF THE INVENTION

The object of the invention is therefore to provide an actuator subassembly module for a vehicle brake which does not have these disadvantages. This object is achieved by the actuator subassembly indicated in Claim 1. Subclaims relate to advantageous developments. Further features, advantages and properties of the invention are illustrated on the basis of the following description with reference to the drawings.

DETAILED DESCRIPTION OF THE PREFERRED EMBODIMENT

Figure 1:
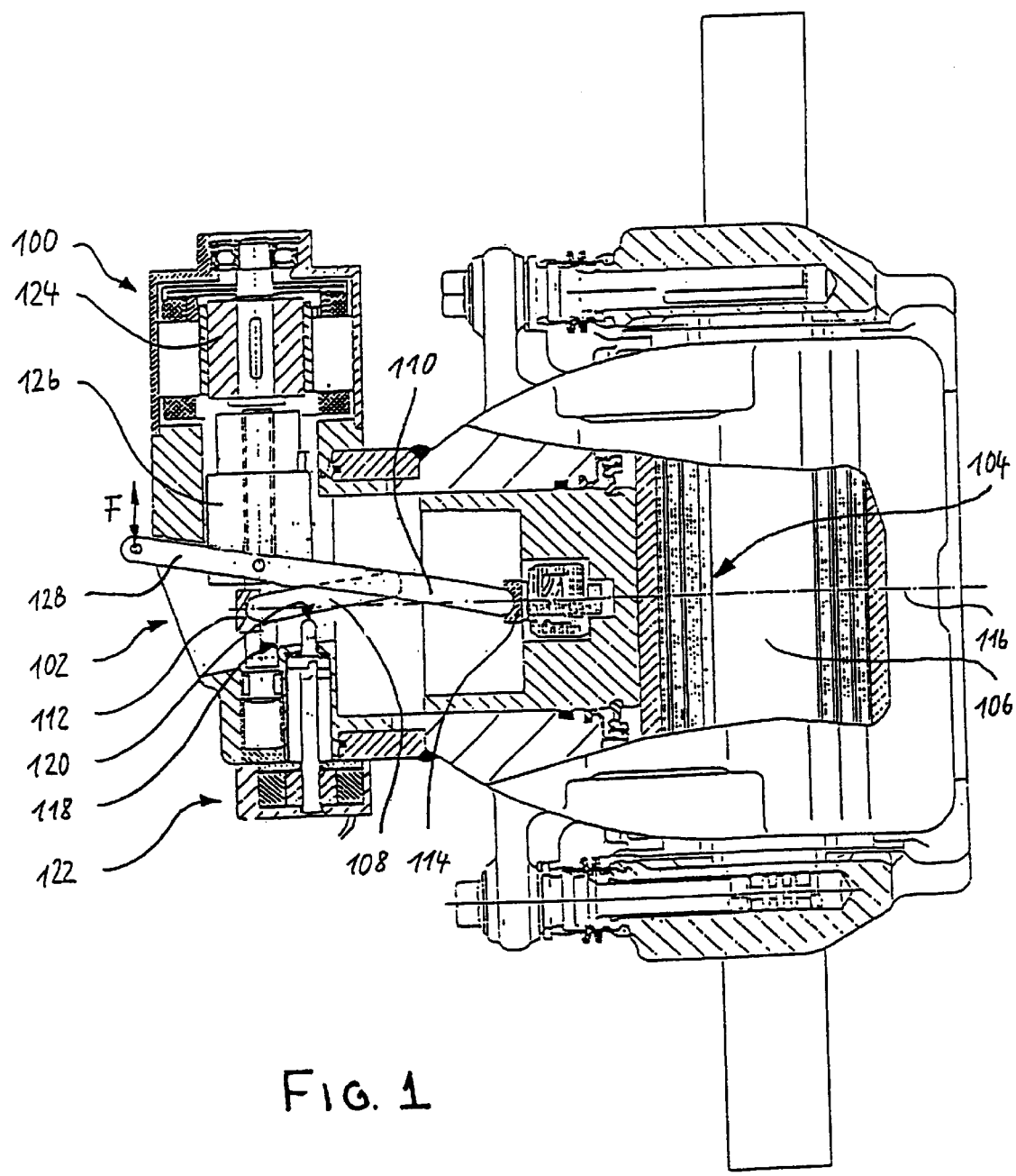
FIG. 1 shows an embodiment of an actuator subassembly according to the invention in a part-sectional side view, with a lever arrangement positioned in the service brake region.

FIG. 1 represents an embodiment of an actuator subassembly, module according to the invention with a drive 100, which is connected to an input side of a lever arrangement 102, which transmits an introduced driving force to a friction element 104, which is thereby pressed against a brake disc 106.

The illustrated lever arrangement with two arms 108 and 110, the first arm 108 of which is half as long as the second arm 110, is particularly suitable for carrying out the concept according to the invention. The first arm 108 is hinged at its first end to the second arm 110 in the centre of the latter and is supported by way of its second end in a locating bearing 112. The second arm 110 is connected at its first end via a movable bearing 114 to the axially displaceable friction element 104 and is optionally loaded at its second end via the drive 100 with a force acting in the direction of the locating bearing 112. Both the drive 100 as well as the locating bearing 112 and the movable bearing 114 of the friction element 104 are loaded without any transverse force as a result of this particularly advantageous configuration.

The lever arrangement 102 is self-releasing in the state represented in FIG. 1. If the force which is introduced is reduced, the friction element 104 is therefore returned on account of its preload, without this movement being inhibited by the lever arrangement 102.

Figure 2:
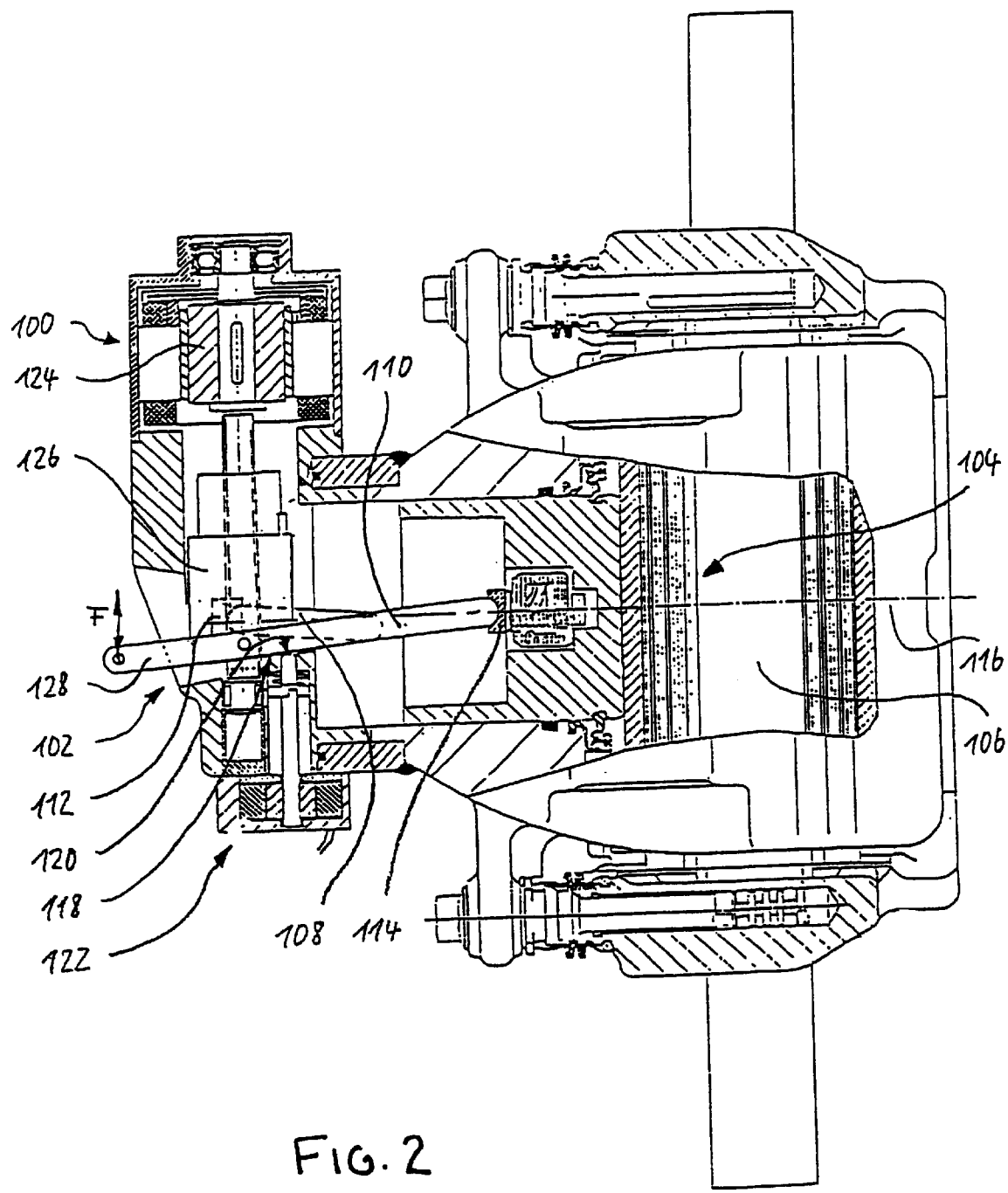
FIG. 2 shows an actuator subassembly according to Claim 1 with the lever arrangement in the parking brake position.

FIG. 2 represents the actuator subassembly according to Claim 1 in a state in which the lever arrangement 102 is in the parking brake position.

In a further configuration of the invention the lever arrangement 102 comprises a force reversal point which lies on an axis 116. By moving the lever arrangement 102 beyond this force reversal point, the lever arrangement can be changed over from the service brake region into a parking brake position. The lever arrangement 102 expediently lies against a stop 118 in this position, so that it is maintained in this position.

The lever arrangement 102 is self-locking in this position. If the driving force which is introduced is cancelled, the friction element 104 is prevented from executing a return movement by the lever arrangement 102. The preloading force of the friction element 104, which is pressed against the brake disc 106, is thereby taken up within the brake. This signifies a considerable advantage, as no force acts on the operating device of the vehicle brake in the parking brake position. The operating device of the vehicle brake can therefore be formed in a simpler and less expensive manner. The fact that the parking brake position can be maintained independently of operating and transmission devices of the vehicle brake makes the brake system safer.

As in the case of the preferred embodiment of the invention, the lever arrangement 102 can easily be held in the parking brake position by means of a mechanical stop disposed in a stationary fashion on the housing or similar limiting means.

The preloading force between the friction element 104 and the brake disc 106 which is maintained by the lever arrangement is in this case dependent on the distance of the stop 118 from the axis 116. The smaller this distance, the greater the preloading force which is transmitted by the lever arrangement 102 to the friction element 104.

A further hydraulic transmission stage may optionally also be disposed between the lever arrangement 102 and the friction element 104 in order to increase the force applied by the friction element 104 to the brake disc 106. It is also possible to dispose resilient compensating members such as, e.g. wave washers, between these two elements in order to facilitate the movement of the lever arrangement 102 beyond its force reversal point and compensate for wear of the friction element 104.

While a particularly advantageous embodiment of the lever arrangement 102 is shown in FIGS. 1 and 2, other lever arrangements are conceivable. For example, the arm 108 may be omitted and the service brake region of the lever arrangement 102 confined by a stop on the arm 110 in a simplified construction of the arm 108.

On account of legal safety regulations, the vehicle brake may not be changed over to the parking brake position when in the service brake state without operating the parking brake system. In order to meet this requirement, a second mobile stop 120 is therefore advantageously provided which either confines the lever arrangement 102 in the service brake region or allows it to move into the parking brake position. This prevents the vehicle brake from taking up the parking brake position when this is not desired.

As a result of coupling a mobile stop 120 of this kind to the lever arrangement 102, it is also possible to apply both compressive forces which confine the service brake region and tensile forces which can change the lever arrangement 102 over from the maximum position of the service brake region into the parking position. The lever arrangement 102 may thus be moved into and/or out of the parking brake position by means of the mobile stop 120. An arrangement of this kind can satisfy the legal requirement for a separate operating device for the service and parking brake.

It is also possible for the mobile stop 120 to be operated by an electrically controllable actuating device 122. In this case it is particularly advantageous for the second mobile stop 120 to be stable in the absence of current in the position which confines the service brake region, so that the energy consumption is minimal during the service brake function. A bistable change-over switch, for example, which is only energised when operated, may be used for this purpose. A moving magnet is used as actuating device in the embodiment represented in FIGS. 1 and 2 in order to achieve particularly high operating forces.

The drive 100 comprises an electric motor 124 with a spindle drive 126. An actuator subassembly of this kind may therefore be used in a vehicle brake of the so-called brake-by-wire type. Particular advantages are achieved if the spindle drive 126 which is used is self-releasing, for the self-releasing action of the toggle arrangement 102 is fully effective in a case of this kind. However it should be borne in mind that self-locking of the lever arrangement 102 is also necessary if the spindle drive 126 is not of self-locking construction, as self-locking of the spindle drive 126 would not in itself be sufficient also to maintain the parking brake function under changing environmental influences (e.g. cold-heat load). When using a self-releasing spindle drive 126, the electric motor 124 may be a unidirectional motor, which is of a compact design and has a low current consumption. A motor of this kind can be operated at low voltage.

The lever arrangement 102 comprises a lever 128 on which a force F acts via an operating device. The lever 128 is in this respect preferably formed such that it extends out of the housing of the actuator subassembly.

On account of the lever principle, the relatively long lever 128 enables a small operating force F of the operating device to be converted into a large output force on the friction element 104. The operating device of the lever 128 may therefore be constructed as a mechanical appliance which can be manually operated, e.g. a known hand brake lever with a traction cable transmission can be used here.

However it is advantageous for the operating device of the lever 128 to comprise an electrically operable second drive in order to obtain a vehicle brake which can be operated purely by electrical means. A combination of a manually operable operating device of the lever 128 with an electrically operable second drive is also appropriate. Should the voltage supply of the electric drives fail, both an emergency braking and an emergency release function of the vehicle brake can be achieved via manual operation. In order to simplify an emergency release function of this kind and as a low-budget application, the operating device of the lever 128 may be mechanically coupled to the second mobile stop 120, so that the second mobile stop 120 is also moved when the lever 128 moves and the lever arrangement 102 is allowed to move into the parking brake position. This coupling may be effected mechanically via an additional transmission, so that an increased force can be applied to the second mobile stop 120 when changing the lever arrangement 102 over from the parking brake position to the service brake region.

According to the embodiments presented above, the lever arrangement 102 can be moved by means of the drive 100, the mobile stop 102 or the operating device of the lever 128 from the service brake region into the parking brake position or from the parking brake position into the service brake region. In order to satisfy the legal requirements for separate operation of the service brake, the parking brake and an emergency brake, as well as the emergency release function of the parking brake, combinations of the above-mentioned drive and operating means are optionally possible. When using a plurality of electric drives, it is in particular an advantage that the electrically controllable actuating device of the second mobile stop 120 and the electric drives of the operating device of the lever 128 and the spindle drive 126 are supplied by either separate or common voltage sources. This measure also guarantees redundant implementation of the brake function in a brake system of the brake-by-wire type.

The described actuator subassemblies may be used in their various embodiments within a vehicle brake. It is in particular an advantage to mount on each wheel brake of at least one axle a respective actuator subassembly, each of which comprises a lever 128 and which can be jointly operated via an operating device with the force F.

What is claimed is:

1. An actuator subassembly for a vehicle brake with a drive, which is connected to an input side of a lever arrangement, wherein an output side of said lever arrangement is adapted to operate at least one friction element of the vehicle brake, characterised in that said lever arrangement can be changed over from a service brake region, in which said lever arrangement is self-releasing, beyond a force reversal point thereof into a parking brake position, in which said lever arrangement is self-locking after releasing an actuation force of the lever arrangement.

2. The actuator subassembly according to claim 1, characterised in that said lever arrangement lies against a stop in said parking brake position.

3. The actuator subassembly according to claim 1, characterised in that a second mobile stop either confines said lever arrangement in said service brake region or allows said lever arrangement to move into said parking brake position.

4. The actuator subassembly according to claim 3, characterised in that said second mobile stop is coupled to said lever arrangement, wherein tensile and compressive forces can be transmitted.

5. The actuator subassembly according to claim 3, characterised in that an electronically controllable actuating device operates said second mobile stop.

6. The actuator subassembly according to claim 5, characterised in that said second mobile stop is stable in the absence of current in the position which confines said service brake region.

7. The actuator subassembly according to claim 1, characterised in that said drive is an electric motor with a spindle drive.

8. The actuator subassembly according to claim 7, characterised in that said spindle drive is self-releasing.

9. The actuator subassembly according to claim 8, characterised in that said electric motor is a unidirectional motor.

10. The actuator subassembly according to claim 1, characterised in that said lever arrangement includes a lever on which a force can act via an operating device.

11. The actuator subassembly according to claim 10, characterised in that said operating device is a mechanical appliance which can be manually operated.

12. The actuator subassembly according to claim 10, characterised in that said operating device is an electrically operable second drive.

13. The actuator subassembly according to claim 10, characterised in that a second mobile stop either confines said lever arrangement in said service brake region or allows said lever arrangement to move into said parking brake position, and said operating device is mechanically coupled to said second mobile stop.

14. The actuator subassembly according to claim 10, characterised in that a second mobile stop either confines said lever arrangement in said service brake region or allows said lever arrangement to move into said parking brake position, an electrically controllable actuating device operates said second mobile stop, said drive is an electric motor with a spindle drive, said operating device is an electrically operable second drive, and said electrically controllable actuating device of said second mobile stop and said electric drives of said operating device and said spindle drive are supplied by either separate or common voltage sources.

15. The actuator subassembly according to claim 10, characterised in that a respective actuator subassembly is disposed on each wheel brake of an axle, wherein said levers of said actuator subassemblies can be operated by a common operating device with said force.

16. The actuator subassembly according to claim 1, characterised in that said lever arrangement includes two arms, said first arm of which is about half as long as said second arm, said first arm hinged at a first end thereof to said second arm in approximately the center of said second arm and supported at a second end thereof in a locating bearing, said second arm connected at a first end thereof to said friction element via a movable bearing and loaded at a second end thereof via said drive with a force acting in the direction of said locating bearing.

17. A vehicle brake including the actuator subassembly according to claim 1.

* * * * *